United States Patent [19]
Unland et al.

[11] Patent Number: 5,517,969
[45] Date of Patent: May 21, 1996

[54] DEVICE FOR DETECTING FAULTS IN AN APPARATUS FOR DETECTING KNOCKING

[75] Inventors: Stefan Unland; Oskar Torno, both of Schwieberdingen; Werner Haeming, Neudenau, all of Germany; Ulrich Rothhaar, Milan, Italy; Iwan Surjadi, Vaihingen, Germany; Wolfgang Hilbert, Moeglingen, Germany; Robert Sloboda, Markgroeningen, Germany; Michael Baeuerle, Besigheim, Germany

[73] Assignee: Robert Bosch GmbH, Stuttgart, Germany

[21] Appl. No.: 436,381
[22] PCT Filed: Sep. 10, 1994
[86] PCT No.: PCT/DE94/01041
    § 371 Date: May 11, 1995
    § 102(e) Date: May 11, 1995
[87] PCT Pub. No.: WO95/08760
    PCT Pub. Date: Mar. 30, 1994

[30]     Foreign Application Priority Data

Sep. 25, 1993 [DE] Germany ............... 43 32 711.7

[51] Int. Cl.⁶ .................................................. F02P 5/14
[52] U.S. Cl. ..................................................... 123/425
[58] Field of Search .................... 123/425, 630, 123/479; 75/35.03

[56]              References Cited

U.S. PATENT DOCUMENTS

| | | | |
|---|---|---|---|
| 4,521,769 | 6/1985 | Dudeck et al. | 73/35.03 |
| 4,599,982 | 7/1986 | Sugiura | 123/425 |
| 5,020,499 | 6/1992 | Kojima et al. | 123/479 |
| 5,134,980 | 8/1992 | Sakakibara et al. | 123/425 |
| 5,287,837 | 2/1994 | Hashimoto et al. | 123/425 |
| 5,388,560 | 2/1995 | Hisaki et al. | 123/630 |

FOREIGN PATENT DOCUMENTS 3128475  1/1988  Germany ............... 123/425

*Primary Examiner*—Raymond A. Nelli
*Attorney, Agent, or Firm*—Michael J. Striker

[57]              ABSTRACT

A device for detecting faults in conjunction with the detection of knocking in an internal combustion engine is disclosed, in which device the sensor output signals are compared with an engine speed-dependent, normalized reference level in order to detect knocking. As a function of the comparison result, knocking is detected and, when knocking is detected, knocking-preventing measures are initiated. So that the internal combustion engine does not erroneously go into unacceptable operating states when a knocking sensor or the associated evaluation circuit is operating incorrectly, continuous detection of faults takes place, during which it is tested whether the normalized reference level lies within a permitted range which is formed as a function of engine speed, this range being either the permitted, normalized reference level band or a range between an engine speed-dependent upper limit value (UGO) and an engine speed-dependent lower limit value (UGU). If the normalized reference signal level leaves this range for a prescribable time, a fault is detected and safety measures are initiated which are effective until the reference level lies within the permitted range again.

9 Claims, 2 Drawing Sheets

5,517,969

DEVICE FOR DETECTING FAULTS IN AN APPARATUS FOR DETECTING KNOCKING

PRIOR ART

The invention is based on a device for detecting faults, of the generic type of the main claim.

It is known that, in internal combustion engines with knocking control, it is necessary to monitor the operational capability of the knocking sensor which makes detection of knocking possible. Otherwise, there is the risk that in the event of the knocking sensor or a component of the associated evaluation circuit failing knocking is not detected and the working point of the internal combustion engine is erroneously shifted into the knocking range, which can result in a hazard for the internal combustion engine itself.

Therefore, in DE-PS 31 28 475 a testing device for a knocking control apparatus on an internal combustion engine is proposed, in which testing device a knocking sensor with an evaluation circuit which is connected downstream and triggers shifting of the ignition angle when knocking occurs is tested for correct operational capability.

In the known device, the knocking detection takes place during a measuring phase. For this purpose, the output signal of the knocking sensor is compared in a known manner with an adaptable reference value. Knocking is detected from the result of the comparison. During a test phase, the output signal of the knocking sensor is compared with another, lower reference value. Operational faults are then detected from this comparison result if the output signal does not exceed the reference signal.

The known testing device for a knocking control apparatus on an internal combustion engine has the disadvantage that a measuring phase and a test phase are required and testing is not possible in the measuring phase, while in the test phase detection of knocking cannot be carried out.

ADVANTAGES OF THE INVENTION

The device according to the invention for detecting faults in an apparatus for detecting knocking in an internal combustion engine has, in contrast, the advantage that the detection of knocking and the detection of faults can proceed alongside one another without interruption so that the occurrence of knocking can be detected at any time and also the detection of faults can be carried out without interruption.

These advantages are achieved in that the reference level, the exceeding of which is the criterion for the detection of knocking, is initially normalized in such a way that it rises as the engine noise increases. Here, this reference level is, on the one hand, used for the detection of knocking and, on the other hand, a comparison is made as to whether the normalized reference level lies within a permitted reference level band. The permitted reference level band is specified in a suitable manner, in particular as a function of the engine speed. A fault is detected if the normalized reference level leaves the permitted reference level band. Here, it is advantageous that detection of faults can only occur if the normalized reference level not only leaves the range permitted for the normalized reference level but also exceeds an upper limit value which is dependent on the engine speed or drops below a lower limit value which is also dependent on engine speed.

Further advantages of the invention are achieved with the measures disclosed in the subclaims. Here, an advantageous feature for increasing the reliability of the detection of faults is that a fault is only detected if the normalized reference level lies outside the permitted reference level band for a specific, selectable time.

It is particularly advantageous that after detection of a fault safety measures are automatically initiated which ensure that the internal combustion engine is always operated in a non-hazardous range. For this purpose, the detection of faults is followed for example by an ignition angle adjustment which is maintained at least until it is detected that the apparatus for detecting knocking is functioning again correctly.

So that the safety measures initiated after detection of a fault are not terminated too early, in a further advantageous embodiment of the invention the cancelling of the safety measures is not initiated until the instantaneous reference level remains within the reference band again during a prescribable time.

DESCRIPTION OF THE EXEMPLARY EMBODIMENT

Figure 1:
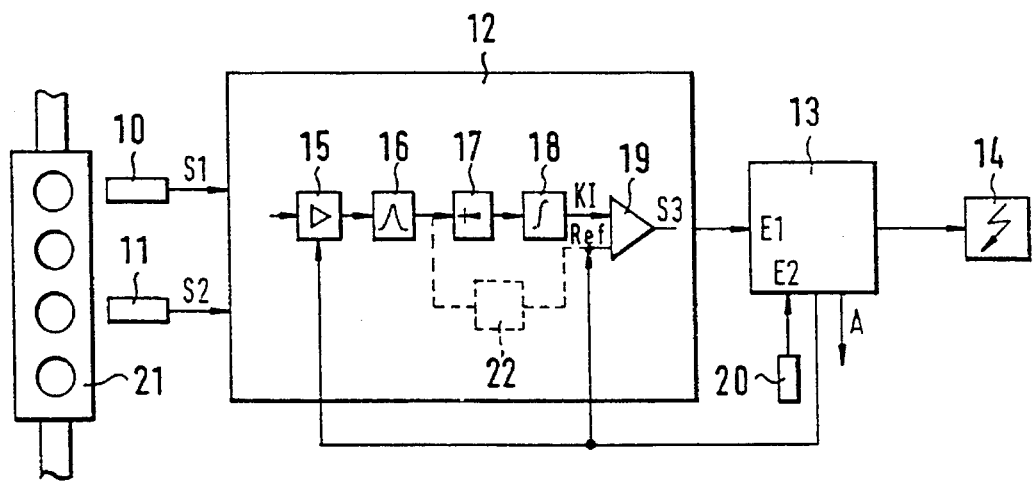
FIG. 1 shows the design of an exemplary embodiment in terms of circuitry.

In the exemplary embodiment illustrated in FIG. 1, an apparatus for detecting knocking in an internal combustion engine with two knocking sensors 10, 11 is illustrated. These knocking sensors 10, 11 are connected via an evaluation circuit 12 to the input E1 of a microcomputer 13 which is a component of a control unit (not illustrated in greater detail).

Further signals which for example characterize the operating state of the internal combustion engine can be fed to the microcomputer 13 via an input E2. Such a signal can be the engine speed n of the internal combustion engine which is measured with a sensor. As a function of the signals of the evaluation circuit 12 and of the further signals which are fed to the input E2, the microcomputer 13 controls the ignition output stage 14 of the internal combustion engine and/or, if appropriate, further devices of the internal combustion engine, for example by emitting appropriate signals at the output A.

The microcomputer 13 can also be designed as a discrete circuit, and the evaluation circuit 12 and the microcomputer 13 can equally be combined to form a single computing device and its operation can be implemented for example with the aid of the control unit of the internal combustion engine.

Instead of, or as an alternative to, influencing the ignition time point as a measure for the displacement of the working point of the internal combustion engine out of the knocking range, the other measures, known per se, for influencing the knocking behavior of an internal combustion engine, for example the enrichment of the combustion mixture, the addition of means for achieving higher resistance to knocking etc., can be used.

In the selected exemplary embodiment, the evaluation circuit 12 comprises at least one amplifier 15 with adjustable amplification factor, to which the output signals which are supplied by the knocking sensors 10, 11 are fed alternately. In an adjoining bandpass filter 16, the amplified signals are filtered in such a way that the signal components with frequencies which are typical of knocking are preferred.

A demodulation circuit 17, for example a rectifier, adjoins the bandpass filter. The signals which are emitted by the demodulation circuit are integrated in the integrator 18, and the integrated signals KI are passed on to a first input of the comparator 19.

The other input of the comparator 19 is fed a reference signal or a reference level Ref which is formed for example in the lowpass filter 22 by averaging the knocking sensor signals using a large time constant. The actual level of the reference signal is however influenced using the microcomputer 13 as a function of the operating states of the internal combustion engine. It is equally possible to influence the level of the output signals of the knocking sensors 10, 11 directly in that the control amplifier 15 is actuated by the microcomputer 13 in a suitable way.

The precise design of the individual elements is not significant for comprehension of the invention and is therefore not indicated in greater detail. Likewise, there is only symbolic representation of the internal combustion engine 21 to which the knocking sensors 10 and 11 are assigned.

Using the apparatus illustrated in FIG. 1 the detection of knocking proceeds as follows: The knocking sensors 10, 11 record the noises which are made by the internal combustion engine 21 and output appropriate signals S1, S2 to the evaluation circuit 12. These signals are filtered in a suitable way and amplified in the control amplifier 15.

After conditioning in the bandpass filter 16, the demodulator circuit 17 and the integrator 18, the output signals of this control amplifier 15 are compared with a reference level Ref in the comparator 19. At the output of the comparator 15 a signal S3 is produced which permits the presence or absence of knocking to be detected, in which process knocking is detected if the output signal of the integrator 18 exceeds the reference level in a prescribable way.

One possible way of forming a particularly suitable reference signal, or the reference level Ref, will now be explained. For this, the reference level Ref is fixed or normalized in the microcomputer 13 in such a way that a continuous rise in the normalized reference level from quiet noise to loud noise of the internal combustion engine is produced.

The determination of the instantaneous reference level Ref is carried out for example according to the formula:

$Ref = (F1-1)/F1 \, Refa + 1/F1 \, KI$ $Ref = {}^{15}/_{16} Refa + {}^{1}/_{16} KI$ In this formula:

Ref=reference level,

Refa=previous reference level,

KI=knocking integral,

F1=16=adjustable factor.

In order to form the normalized reference level, for example the reference level is multiplied with a normalizing factor V(i), a possible formula for forming the normalized reference level is:

$Refn(i) = (8/V(i)) * Ref(i)$

In which:

Refn=normalized reference level,

Ref=reference level,

V(i)=normalizing factor for normalized reference level.

Normalization can take place by adjusting the amplification level as a function of the amplification factor. The normalizing factor has e.g. values of V(i)=1, 2, 4, 8, 16, 32, 64.

Figure 2:
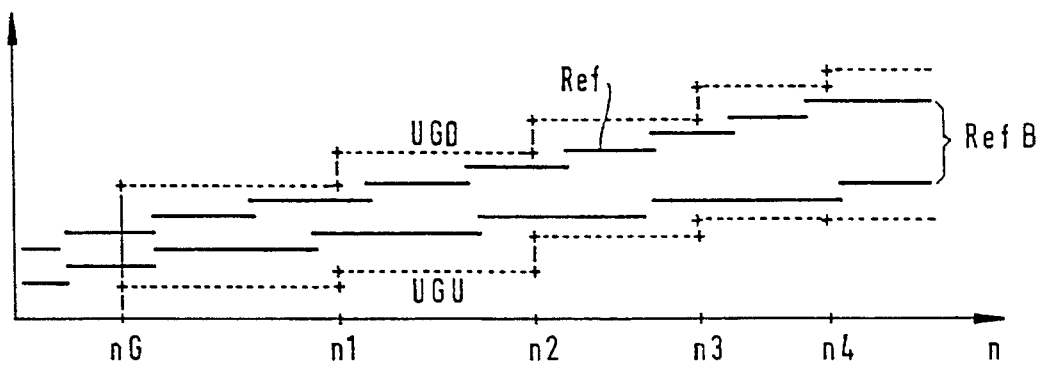
FIG. 2 shows the interrelation between reference level and engine speed.

In order to detect incorrect operation of the knocking sensors or a fault in the evaluation circuit, a permitted reference level band RefB is defined with respect to the engine speed n, as is illustrated in FIG. 2. Furthermore, lower and upper limit values UGU, UGO, which lie at a suitable distance from the limits of the permitted reference level band, are defined as a function of the engine speed. Here, the distance between the limits is specified empirically, a vehicle-specific adaptation can also take place.

In the microcomputer 13, it is tested continuously whether the respectively determined, instantaneous, normalized reference level Refn(i) drops below or exceeds the lower or upper limit value. If this is the case, in the simplest case errors are detected and suitable counter measures, such as the adjustment of the ignition or enrichment of the mixture, are initiated by the microcomputer. The initiated safety measures are cancelled again in the case of this detection of a fault as soon as the instantaneous reference level lies within the reference level band again.

In order to increase the reliability of the detection of faults, further tests and measures are possible, which, if they are not fulfilled, prevent a defect from being detected. One of these measures consists in the fact that the detection of faults is not carried out until the engine speed of the internal combustion engine lies above a limit speed nG.

A further limitation consists in the fact that, in order to detect faults, it is tested whether the normalized reference signal Refn(i) lies outside the permitted reference band for a specific time period t1, and the safety measures are only initiated when this condition is fulfilled.

Furthermore, it is possible for the initiated safety measures not to be cancelled until the instantaneous reference level again lies within the reference level band RefB for a further prescribable time period t2.

In a further embodiment, the safety measures, such as the adjustment of the ignition in the late direction, are not initiated until it is established by the microcomputer 13 that the knocking control is active. However, the detection of faults can also take place when this condition is not fulfilled.

In an arrangement with a plurality of knocking sensors, the knocking sensor which is detected as defective can be excluded from the evaluation and the knocking control can be carried out using only the knocking sensor which is detected as operationally reliable.

In a further embodiment, the effects of the knocking control are eliminated but the knocking control remains active in order to overcome faults; also, the instantaneous adjustments in the late direction can be cleared from the memory as a function of the fault state detected and the adjustment in the late direction can be set to zero and the knocking control adaptation is then idle.

In FIG. 2, permitted reference signal levels are entered against the engine speed n. It is clear here that the permitted reference signal level range RefB becomes larger as the engine speed rises. Here, both the minimum permitted reference level and the maximum permitted reference level rise as the engine speed rises. Overall, this rise is however such that the permitted range RefB increases as the engine speed rises.

Above and below the permitted range further limits UGU, OGO are specified which change with a corresponding dependence on the engine speed and are stored in memories of the microcomputer 13 as engine-speed dependent characteristic curves. If the permitted reference signal level exceeds the upper limit or if it drops below the lower limit, a fault is detected, if appropriate specific time criteria also being taken into account, as already explained.

The value nG is entered in FIG. 2 as the limit engine speed above which faults begin to be detected.

Figure 3:
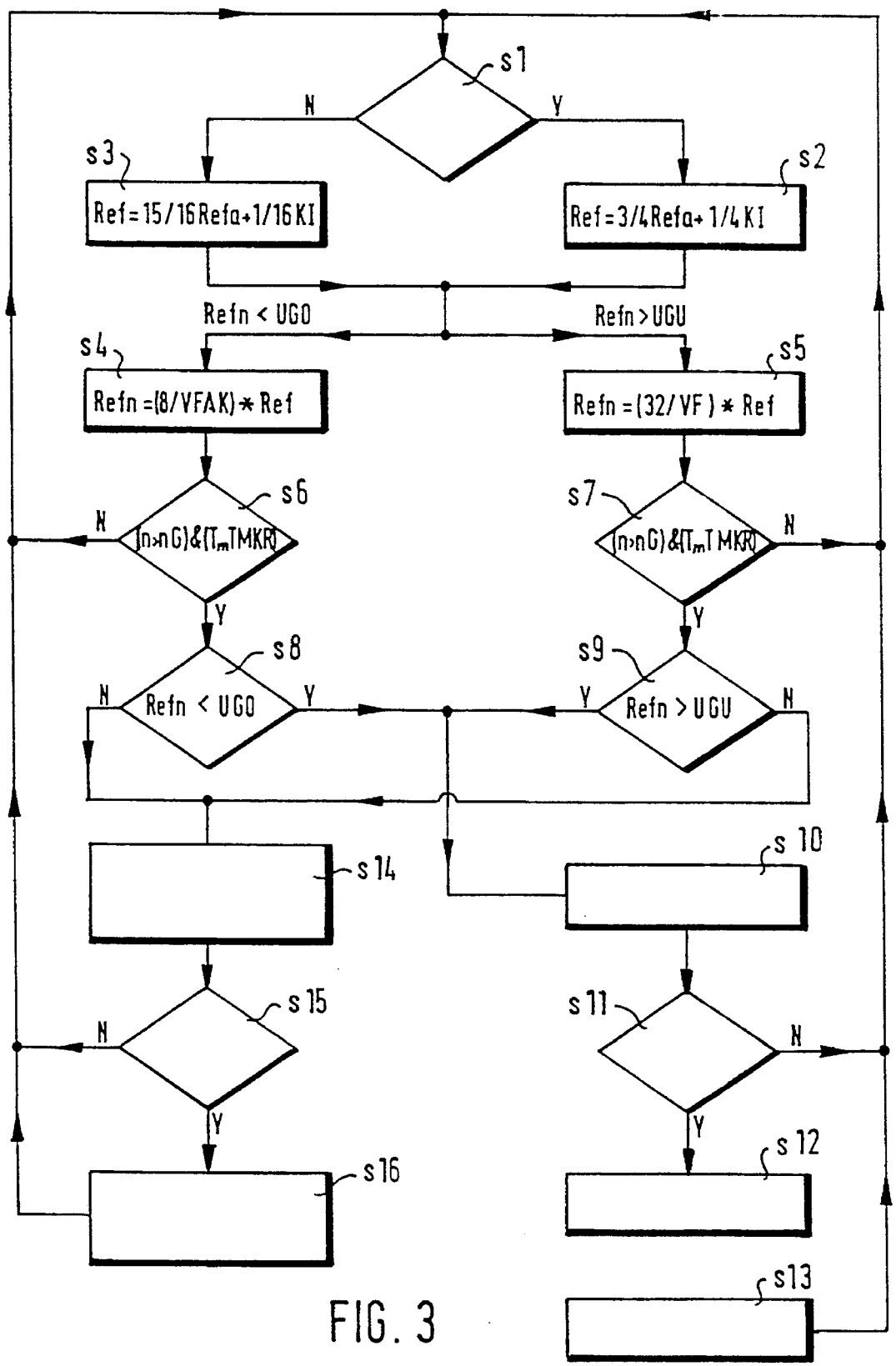
FIG. 3 is a flow diagram which illustrates the procedure for the detection of faults.

In FIG. 3, an example is given which illustrates a possible procedure for the detection of faults. The detection of faults described in FIG. 3 usually proceeds in the control unit of the internal combustion engine in which the required computing, storage and counting means are present. Here, in a first step s1 the control unit detects from data fed to it from individual sensors, for example from the signals of an engine speed sensor, of an airflow rate meter and/or throttle valve signal transmitter, whether the load dynamic or engine speed dynamic is active. If this is the case, an instantaneous reference level is formed in step s2 according to the formula Ref=¾Refa+¼KI. If, on the other hand, it is detected in step s1 that there is no load dynamic or engine speed dynamic present, the instantaneous reference level is formed in step s3 according to the equation Ref=$^{15}/_{16}$Refa+$^{1}/_{16}$KI.

Starting from these values for the instantaneous reference level, in the following steps it is tested whether the normalized reference level Refn is lower than UGO or it is tested whether the normalized reference level is higher than a lower limit value UGU.

For this purpose, in step s4, the normalized reference level is initially formed according to the formula Refn=(8/VFAK)×Ref. In step s5, the normalized reference level is formed according to the formula (32/VAFK)×Ref.

In steps s6 and s7 it is tested whether the engine speed n is higher than the limit engine speed nG and it is tested whether the engine temperature Tmot is higher than a critical value TNKR. The steps s6 and s7 are identical, but they are based on the normalized reference levels determined in steps s4 or s5.

If it is detected in steps s6, s7 that the conditions are not fulfilled, the program beings again with step s1. If, on the other hand, it is detected that the conditions are fulfilled, the program goes to the respective next step s8 or s9. The condition that the engine temperature must lie above a critical value can also be dispensed with in step s6 and s7.

In step s8 it is tested whether the normalized reference level Refn is lower than the upper limit value UGO. In step s9 it is tested whether the normalized reference level according to step s7 is higher than the lower limit value UGU. If the condition of the step s8 or the condition of the step s9 is fulfilled, in step s10 a fault counter is decremented, that is to say counted down by 1. In step s10, it is tested whether the fault counter has already reached the value 0, if this is not the case the program begins again with step s1, if, on the other hand, the fault counter is at 0, alternative measures are activated in step s12.

If it is detected in step s11 that the fault counter is not equal to 0, the program for the next cylinder begins, this is symbolized by step s13. If it is detected in steps s8 and s9 that the normalized reference value Refn is lower than the upper limit value UGO or higher than the lower limit value UGU, in step s14 a fault elimination counter is decremented or a fault counter is reset. In step s15 it is then tested whether the counting value of the fault elimination counter is equal to 0. If this is not the case, the program begins with step s1 again.

If, on the other hand, the fault elimination counter is at 0, the alternative measures are rescinded, the rescinding not being carried out until the knocking control has been in an inactive phase at least once. The safety measures are therefore cancelled again if the instantaneous reference level lies within the range prescribed by the reference voltage thresholds UGO and UGU. So that no jumps in the ignition angle (torque) occur during the elimination of faults, the transition from a safety adjustment in the late direction of the ignition angle to normal operation does not take place until the first inactive phase of knocking control after it has been established that faults are being eliminated. The values which are stored in the fault counters are stored permanently so that they remain stored even when the internal combustion engine is switched off.

In a fault management system or fault storage management system, the conditions for the initiation of alternative measures can be specified using OR gates and RS flipflops. Likewise, it is possible to detect when a test cycle for a sensor has been completely executed.

We claim:

1. A device for detecting faults in an apparatus for detecting knocking in an internal combustion engine, having at least one knocking sensor and one evaluation circuit which is connected downstream of the latter and which compares the output signals of the knocking sensor with a variable reference level which is formed as a function of the output signals of the knocking sensor, and detects knocking as a function of the comparison result, wherein the reference level (Ref) is normalized in such a way that it rises as the noise of the internal combustion engine becomes greater, wherein a permitted reference level band (RefB) is formed and a fault is detected if an instantaneous, normalized reference level value (Refn(i)) lies outside the permitted reference level band (RefB).

2. The device as claimed in claim 1, wherein a fault is only detected if a plurality of normalized reference level values (Refn(i)) lie outside the permitted reference level band and/or if the normalized reference level lies outside the permitted reference level band (RefB) for a prescribable time period (t1).

3. The device as claimed in claim 1, wherein detection of faults does not take place until the normalized reference level value (Refn(i)) lies above a further engine speed-dependent limit value (UGO) or below a further engine speed-dependent limit value (UGU).

4. The device as claimed in claim 3, wherein these two limit values are formed as a function of the permitted reference level band (RefB).

5. The device as claimed in claim 1, wherein the permitted reference level band (RefB) is specified as a function of the engine speed (n) and rises overall and widens as the engine speed rises.

6. The device as claimed in claim 1, wherein a lower engine speed limit value (nG) is specified and detection of faults is only performed at engine speeds above this limit value (nG).

7. The device as claimed in claim 1, wherein detection of faults is only carried out when the knocking control is active.

8. The device as claimed in claim 1, wherein measures are initiated when a fault is detected, in particular the ignition angle is adjusted and/or the fuel mixture is made richer, these measures being devised such that the internal combustion engine is in a non-hazardous state.

9. The device as claimed in claim 7, wherein the measures are terminated again when the reference level is inside the permitted range again during a prescribable time period (t2).

* * * * *